UNITED STATES PATENT OFFICE.

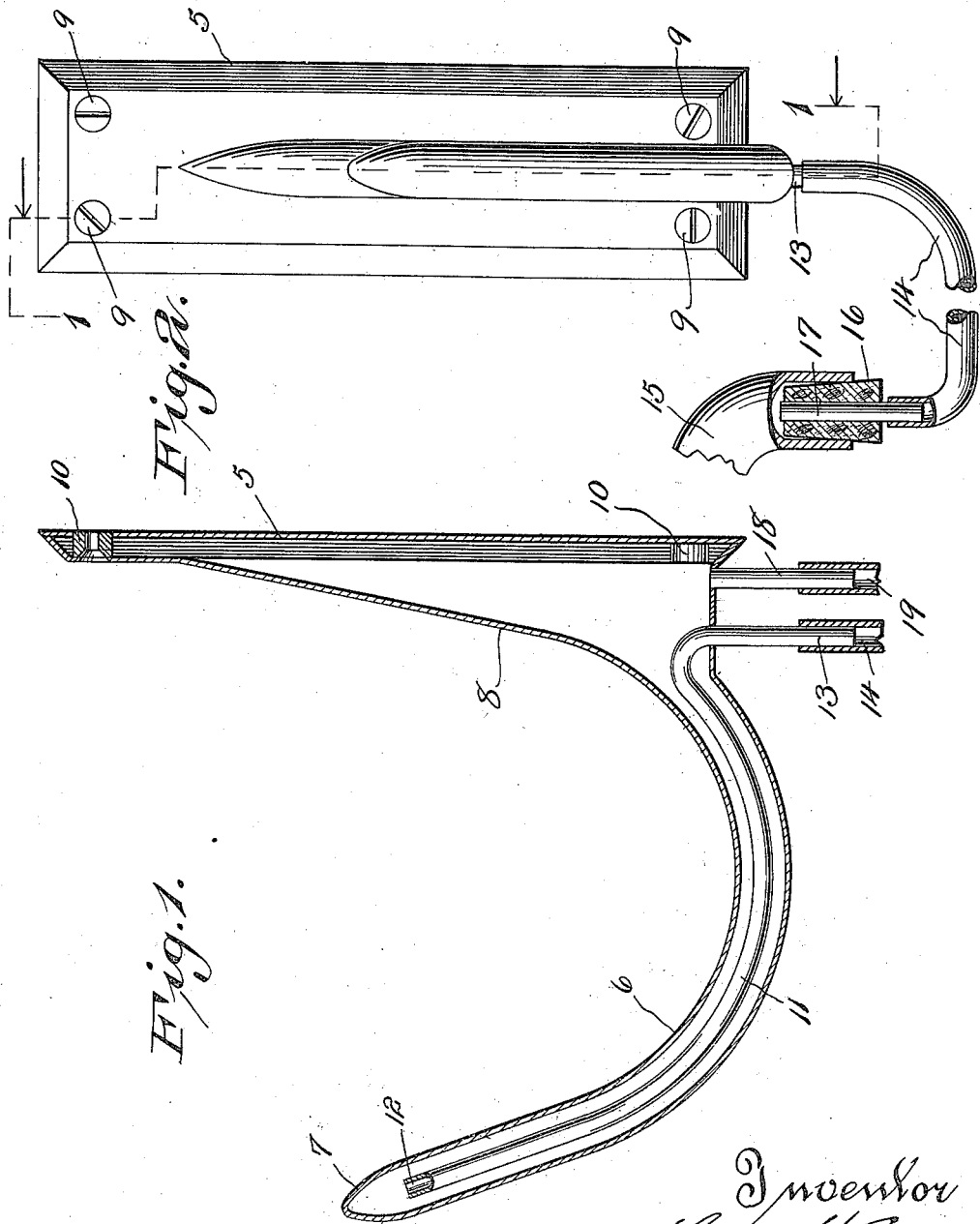

THOMAS H. JACOB, OF WAUSAU, WISCONSIN.

CANDY-PULLING HOOK.

1,261,238.   Specification of Letters Patent.   Patented Apr. 2, 1918.

Application filed June 29, 1917. Serial No. 177,661.

*To all whom it may concern:*

Be it known that I, THOMAS H. JACOB, a citizen of the United States, and resident of Wausau, in the county of Marathon and State of Wisconsin, have invented certain new and useful Improvements in Candy-Pulling Hooks; and I do hereby declare that the following is a full, clear, and exact description thereof.

My invention relates to certain new and useful improvements in hooks and refers particularly to what is generally termed a taffy pulling hook.

The primary object of this invention is to provide a candy pulling hook having means for keeping the same in a cold condition in order to partly chill the portion of candy engaging the same and thereby preventing the sticking thereto of the candy.

A further object is to provide a candy pulling hook which may be maintained at any desired temperature, and which will be of such simple construction as to permit the production thereof at a low price.

With the above and other objects in view, which will appear as the description proceeds, my invention resides in the novel construction, combination and arrangement of parts substantially as hereinafter described and particularly defined by the appended claims, it being understood that such changes in the precise embodiment thereof may be made as come within the scope of the claims.

In the accompanying drawings I have illustrated one complete example of the physical embodiment of my invention constructed according to the best mode I have so far devised for the practical application of the principles thereof, in which:

Figure 1 is a sectional view taken longitudinally through my device on the line 1—1 of Fig. 2, and Fig. 2 is a front elevational view thereof, a portion of a water supply means being illustrated part in section and part in elevation.

Referring now more particularly to the accompanying drawings, the numeral 5 represents the supporting base for my device which may either be hollow as shown in the drawings or may be solid, and extending outwardly from the base portion is a tubular hook member 6 having its outer end closed as at 7 and its inner end formed with an enlargement 8, which in the present instance communicates with the hollow base 5. The base portion 5 is adapted to be secured to any suitable support by means of fastenings 9 which pass through thimbles 10 connected with alined openings in the front and rear walls thereof as shown in Fig. 1.

To provide for the circulation through the hollow hook member 6 and base portion 5, a tube or pipe 11 extends through the entire length of the hook member and has its outlet end 12 terminating near the closed end 7 of the hook and its inlet end 13 terminating outwardly of the enlarged portion 8. As shown in Fig. 2 the end 13 of the pipe 11 is connected by a suitable tubing 14 with the water supply faucet or pipe 15, and in this instance the means for connecting tube 14 with supply pipe 15 comprises a stopper member 16 having passing centrally therethrough a nipple 17 in communication with tube 14. In order to complete the circulation and provide means for carrying off the water in the hook member, an outlet 18 is provided leading from enlargement 8 and connected by means of tubing 19 with the sewer, not shown.

Thus it will be seen from the foregoing description taken in connection with the accompanying drawings that at all times a free circulation of water through the hook member 6 is provided, and that the temperature of the hook may be made to vary by regulating the temperature of the water circulated therethrough.

I claim:

1. A device of the character described, comprising a hollow longitudinal base portion, a hollow hook member mounted on the base portion and communicating therewith, and means connected with the base portion and hook member for circulating fluid therethrough to maintain the base and hook at an even temperature.

2. A device of the character described, comprising a base portion, a hollow hook member having its outer end closed and its inner end enlarged and secured to said base portion, a tube passing centrally through the length of the hook member and having one end terminating in said hook near the closed end thereof and its other end terminating outwardly of said enlarged portion and adapted for connnection with a fluid supply, whereby the entire outer surface of the hook is maintained at the same temperature, and an outlet leading from said enlarged portion to provide for the circulation through the hook member of fluid substantially as described.

3. A device of the character described, comprising a hollow base portion, a tubular hook member having its outer end closed and its inner end gradually enlarged to the size of the hollow base and secured thereto and in communication therewith, a tube passing through the entire length of the hook member and having one end terminating in said hook member and its other end terminating outwardly of said enlarged portion and adapted for connection with a fluid supply, and an outlet leading from said enlarged portion to provide for the circulation through the hook member and base member of fluid substantially as described.

In testimony that I claim the foregoing I have hereunto set my hand at Wausau, in the county of Marathon and State of Wisconsin.

THOMAS H. JACOB.

Copies of this patent may be obtained for five cents each, by addressing the "Commissioner of Patents, Washington, D. C."